United States Patent [19]

Ides

[11] 4,142,446

[45] Mar. 6, 1979

[54] PISTON CYLINDER ASSEMBLY

[76] Inventor: Eugene S. Ides, 8915 Komensky, Hometown, Ill. 60456

[21] Appl. No.: 791,435

[22] Filed: Apr. 27, 1977

[51] Int. Cl.² .......................... F15B 15/22; F16J 11/02

[52] U.S. Cl. .......................................... 91/26; 91/395; 92/169

[58] Field of Search ..................... 91/395, 396, 394, 26

[56] References Cited

U.S. PATENT DOCUMENTS

| | | | |
|---|---|---|---|
| 2,710,595 | 6/1955 | Peterson et al. | 91/394 |
| 2,751,886 | 6/1956 | Doutt | 91/394 |
| 2,911,952 | 11/1959 | Peros | 91/394 |
| 3,792,644 | 2/1974 | Ferguson et al. | 91/394 |

FOREIGN PATENT DOCUMENTS

| | | | |
|---|---|---|---|
| 1254973 | 11/1967 | Fed. Rep. of Germany | 91/394 |
| 172319 | 8/1960 | Sweden | 91/394 |

*Primary Examiner*—Paul E. Maslousky
*Attorney, Agent, or Firm*—Bernard L. Kleinke

[57] ABSTRACT

A piston cylinder assembly includes a piston rod reciprocatively mounted within a piston chamber, and a piston fixed to the rod within the chamber. A pair of pots are mounted on opposite ends of the cylinder chamber in fluid communication therewith, each one of the.ports having a laterally extending portion adapted to be connected in fluid communication with a source of fluid under pressure and having an axially extending portion opening into the interior of the chamber. A tapered seal is mounted on one of the end portions of the piston for sealing the axial portion of one of the ports to provide a cushioned movement of the piston at the terminal end of its stroke. A sleeve member extends axially within the last-mentioned axial portion of the port and terminates at one of its ends at a position disposed opposite the lateral portion of the port. A bleeding device permits fluid to leave the chamber as the seal engages sealingly the sleeve member so that the terminal portion of the piston stroke is cushioned.

8 Claims, 5 Drawing Figures

TRAVEL

PISTON CYLINDER ASSEMBLY

The present invention relates in general to a piston cylinder assembly, and it more particularly relates to a cushioned piston cylinder assembly which is compact in size.

Cushioned piston cylinder assemblies have been employed for various different applications, which require the piston of the piston cylinder assembly to smoothly decelerate to a standstill position at the end of the path of travel of the piston. In order to achieve this type of cushioned operation, the pistons have carried seals which move into sealing engagement with the port in the end block of the piston cylinder assembly housing. As a result, fluid is trapped between the piston and the end block to serve as a cushion to retard in a smooth manner the terminal motion of the piston at the end of its stroke. While such a piston cylinder assembly is satisfactory for some applications, it would be highly desirable to have a cushioned piston cylinder assembly of a compact size. In this regard, the heretofore known cushioned piston cylinder assemblies included end blocks which had relatively large dimensions in an axial direction to accommodate the movement of the seal into the axial portion of the port disposed within the end block. In this regard, the port disposed in the end block usually includes an axial portion opening into the piston chamber and a laterally extending portion which is adapted to be connected to a source of fluid under pressure. Thus, the axial portion of the port had to be sufficiently long to enable the piston to come to a cushioned stop before the seal began to block the lateral portion of the port. The axial portion of the port had to be sufficiently long to accommodate this movement of the piston, and thus the end block had to be relatively large in its axial dimension. Hence, it would be highly desirable to have a compact cushioned piston cylinder assembly which had a relatively smaller size end block. In this regard, the axial length of the end block should be greatly reduced in size.

Therefore, the principal object of the present invention is to provide a new and improved cushioned piston cylinder assembly, which is compact in size.

Another object of the present invention is to provide such a new and improved cushioned piston cylinder assembly, which has a piston cylinder assembly housing end block having a relatively small axial dimension.

Briefly, the above and further objects of the present invention are realized by providing a piston cylinder assembly which includes a piston fixed to a piston rod disposed within a piston chamber. A pair of ports at the opposite ends of the piston chamber are adapted to be connected in fluid communication with a source of fluid under pressure to enable the piston to be moved reciprocatively within the chamber. At least one of the ports has a laterally extending portion adapted to be connected in fluid communication with the source of fluid under pressure and has an axially extending portion opening into the interior of the chamber. A tapered seal is mounted on one end portion of the piston for sealing the axial portion of the port as the piston moves toward the end of its stroke in that direction. A sleeve member extends axially within the axial portion of the port and terminates at one of its ends at a position disposed opposite the lateral portion. A bleeding device permits fluid to leave the chamber as the seal engages sealingly the sleeve member. By providing the sleeve member, the seal can move into the port and come to rest at a position opposite the lateral portion of the port without blocking it. Thus, the axial dimension of the end block in which the port is disposed is relatively small to enable the piston cylinder assembly to be compact in size.

The invention, both as to its organization and method of operation, together with further objects and advantages thereof will best be understood by reference to the following detailed description taken in connection with the accompanying sheet of drawings, wherein.

Figures 1, 2, 3, 4, 5:
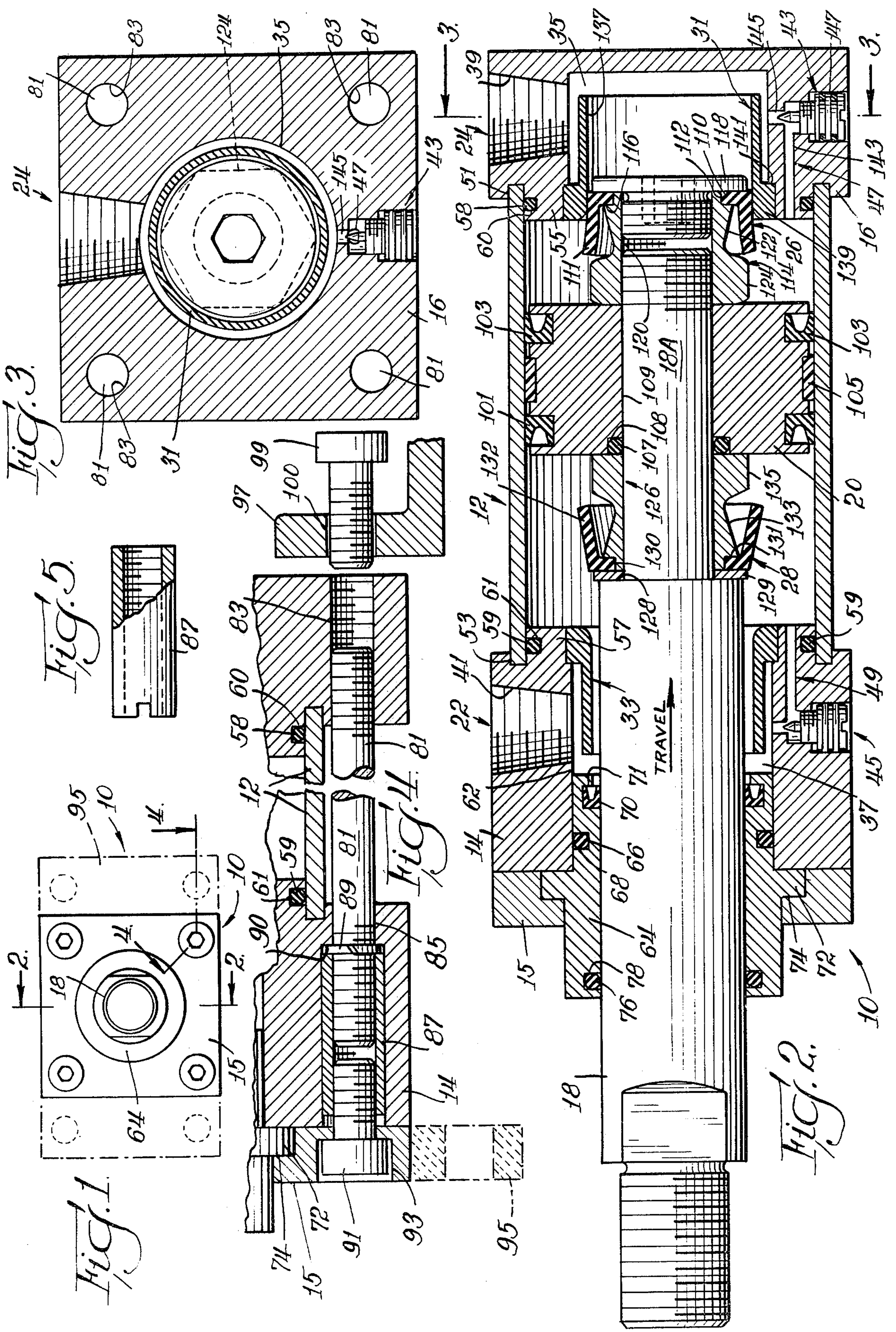
FIG. 1 is a front end view of a piston cylinder assembly which is constructed in accordance with the present invention.
FIG. 2 is an enlarged longitudinal cross-sectional view of the piston cylinder assembly of FIG. 1 taken substantially along the line 2—2 thereof.
FIG. 3 is a cross-sectional view of the piston cylinder assembly of FIG. 1 taken substantially along the line 3—3 thereof.
FIG. 4 is an enlarged cross-sectional fragmentary view of the piston cylinder assembly of FIG. 1 taken substantially along the line 4—4 thereof.
FIG. 5 is a broken-away side elevational view of a sleeve nut shown in FIG. 4 of the drawings.

Referring now to the drawings, and more particularly to FIGS. 1, 2 and 3 thereof, there is shown a piston cylinder assembly 10, which is constructed in accordance with the present invention. The piston cylinder assembly 10 generally comprises a tubular housing 12 having a centrally-apertured front end block or head 14 which in turn has a centrally-apertured outer retaining plate 15 secured to the front face thereof. A centrally-apertured rear end block or cap 16 is disposed at the rear end of the tubular housing 12. A piston rod 18 is disposed within and axially aligned with the tubular housing 12 for reciprocative movement therewithin. A piston 20 is fixed to the piston rod 18 intermediate its ends. A front port 22 disposed within the head 14 is adapted to be connected to a source of fluid under pressure to drive the piston 20 rightwardly as viewed in FIG. 2 of the drawings. A rear port 24 disposed within the end cap 16 is also adapted to be connected to a source of fluid under pressure for driving the piston 20 in a frontwardly direction or toward the left as viewed in FIG. 2 of the drawings.

A pair of cup-shaped cushion seals 26 and 28 are secured to the piston rod 18 at a reduced diameter portion 18A thereof at opposite sides of the piston 20. A pair of cushion sleeves 31 and 33 are disposed within the respective axial portions 35 and 37 of the respective ports 24 and 22 to receive sealingly the respective seals 26 and 28 as hereinafter described in greater detail. The ports 24 and 22 each includes laterally or radially extending tapped portions 39 and 41, respectively, which are connected in fluid communication with the respective axial portions 35 and 37. A pair of needle valves 43 and 45 are mounted within the cap 16 and the head 14, respectively, to control a pair of bleed passages 47 and 49 disposed within the cap 16 and the head 14, respectively. The bleed passage 47 connects in fluid communication the interior of the tubular housing 12 with the axial portion 35 of the port 24. Similarly, the bleed passage 49 connects in fluid communication the interior of the tubular housing 12 with the axial portion 37 of the port 22 so that as the seals 26 and 28 enter their respective cushion sleeves 31 and 33, the fluid trapped between the piston 20 and the cap or the head can escape in a controlled manner to provide the desired cushioning effect.

It should be understood that the piston cylinder assembly of the present invention may be used with either air under pressure or with hydraulic liquid under pressure.

Considering now the tubular housing 12 in greater detail with particular reference to FIG. 2 of the drawings, a pair of oppositely-disposed confronting annular grooves 51 and 53 receive the opposite ends of the housing 12. A pair of oppositely-disposed confronting bosses 55 and 57 project from the respective rear and front end blocks 16 and 14 to fit snugly within the opposite ends of the tubular housing 12. A pair of O rings 58 and 59 are disposed within the respective annular grooves 60 and 61 of the respective rear and front end blocks 16 and 14 to seal the end blocks to the tubular housing 12.

Considering now the front end block or head 14 in greater detail with reference to FIG. 2 of the drawings, a central aperture 62 extending through the front end block 14 receives a piston rod bushing 64 which extends into the front portion of the central aperture 62 terminating near the central portion of the block 14, the remaining portion of the central aperture 62 forming the axial portion 37 of the port 22 so that the rod bushing 64 is spaced axially from the laterally or radially extending portion 41 of the port 22. An O ring 66 fits in an annular groove 68 in the bushing 64 to seal it to the front end block 14. A low friction self-adjusting Buna-N block V seal 70 is disposed within an annular groove 71 in the rear portion of the bushing 64 to seal it to the piston rod 18. An external annular flange 72 of the rod bushing 64 fits within a recess 74 in the retaining plate 15. An O ring 76 fits within an annular groove 78 in the front end portion of the bushing 64 to seal it to the rod 18.

According to one feature of the invention, different types and kinds of mounting brackets may be employed with the piston cylinder assembly 10 and attached to it without the necessity of disassembling the entire piston cylinder assembly. The importance of this feature is that the user can change mounting brackets and need not be concerned with disassembling the entire unit which is precisely set and adjusted by the manufacturer. For these purposes, a set of four tie rods, such as the tie rod 81, are threaded at their opposite ends. A pair of aligned holes 83 and 85 in the respective end blocks 16 and 14 receive the opposite ends of the tie rod 81, the hole 83 being threaded and extending through the rear end block or cap 16 for threadably receiving the threaded end portion of the tie rod 81. The tie rod 81 extends from the rear end block 16 along the outside of the tubular housing 12 to the front end block or cap 16. A sleeve nut 87 is disposed within an enlarged front end portion of the hole 85 and is tightened onto the front threaded end portion of the tie rod 81 against a lock washer 89 disposed between the sleeve nut 87 and a shoulder 90. A bolt 91 extends through a counter-sunk hole 93 in the outer retaining plate 15 and into the enlarged portion of the hole 85, the bolt 91 being tightened into the front end of the sleeve nut 87. It should be understood that there are a series of other similar tie rods, lock washers, sleeve nuts and bolts.

In order to have interchangeable mounting brackets, such as the mounting plate 95 shown in broken lines in FIGS. 1 and 4 of the drawings, the retaining plate 15 may be removed from the front end block 14 by removing the bolts therefrom. The mounting plate 95 may then be placed in overlying relationship with the front face of the front end block 14 in place of the retaining plate 15, the bolts then being positioned such that they extend through the apertured mounting plate 95 and are tightened into the sleeve nuts. As a result, different types and kinds of mounting devices may be attached to the front end block 14 without disassembling the tubular housing 12 and the working parts contained therein. Also, as shown in FIG. 4 of the drawings, a mounting bracket 97 may be fastened to the rear face of the rear end block 16 by means of bolts, such as the bolt 99 extending through a hole 100 therein and into the threaded hole 83 in the rear end block 16. Thus, the mounting bracket 97 may also be removed in a convenient manner from the rear end block 16 and another type of mounting bracket (not shown) may be attached to the rear end block 16 for replacement purposes without disassembling the tubular housing 12 and the working parts contained therewithin.

Considering now the piston 20 in greater detail with reference to FIG. 2 of the drawings, a pair of annular seals 101 and 103 extend along the circumference of the piston 20 to seal it dynamically to the tubular housing 12. The seals 101 and 103 are preferably composed of flexible material, such as Buna-N material. The seals 101 and 103 are V-type seals. An annular bearing 105 surrounds the piston 20 and engages the inside surface of the cylinder 12. The bearing 105 is composed of suitable material such as Nylon or Teflon. An O ring seal 107 is disposed within an annular recess 108 surrounding the reduced diameter portion 18A of the piston rod 18, which extends through an axial hole 109 extending through the piston 20.

Considering now the cup-shaped cushion seals 26 and 28 in greater detail with reference to FIG. 2 of the drawings, the cushion seal 26 will now be considered, since it is similar to the seal 28. The seal 26 includes an end wall 110 having a depending annular skirt 111. A central aperture 112 in the end wall 110 overlies the end face of a spacer 114, which has its rear end portion extending into the central aperture 112 of the seal 26, which is seated against an annular shoulder 116 at the rear end portion of the spacer 114. A flat head retaining bolt 118 is tightened into an internally threaded hole 120 in the spacer 114 to secure the seal 26 to the spacer 114.

An inwardly tapered annular recess portion 122 of the spacer 114 disposed within the skirt 111 of the cushion seal 26 receives the skirt as it deforms inwardly upon entering the sleeve 31. Hex head flats 124 on the exterior of the spacer 114 facilitate the tightening of it onto the distal end portion of the reduced diameter portion 18A of the rod 18.

A spacer 126 at the front side of the piston 20 fits between the piston 20 and a shoulder 128 with a washer 129 disposed between the spacer 126 and the shoulder 128. The seal 28 includes an end wall 130 which fits against an annular shoulder 131 and has a depending skirt 132 surrounding an inwardly tapered annular recess portion 133 of the spacer 126. It should be understood that the two spacers and the two seals are similar to one another in size and shape with the exception that the rear end portion of the spacer 126 in place of a hex head configuration has a smoothly rounded portion 135.

Considering now the sleeves 31 and 33 in greater detail with reference to FIG. 2 of the drawings, the sleeve 31 will now be described since it is similar to the sleeve 33. The sleeve 31 includes a tube 137 having an annular flange 139 which fits within an annular shoulder 141 of the rear end block or cap 16.

Considering now the bleed valves 43 and 45, the bleed valve 43 will now be considered since the bleed valve 45 is similar to it and need not be described in greater detail. The passageway 47 in the rear end block 16 includes an axially-extending passageway portion 143 opening into and being in fluid communication with the interior of the tubular housing 12, and the axial passageway portion 143 being connected in fluid communication with a short radially-extending passageway portion 145, which opens into the interior of the axial portion 35 of the rear port 24. A radial needle valve opening 147 extends from the outer surface of the rear end block 16 to the intersection between the axial passageway portion 143 and the short radial passageway portion 145 for receiving and containing the needle valve 43.

In operation, assuming that the piston 20 is moved rearwardly to its terminal end position, fluid under pressure is supplied to the front port 22 to drive the piston 20 rearwardly, whereby the piston rod 18 moves extensively rearwardly. The cup-shaped cushion seal 26 moves into engagement with and enters the cushion sleeve 31 to close off its forward end portion at the flange 139 sealingly. As a result, fluid is trapped between the piston head 20 and the rear end block 16. This trapped fluid is bled off via the bleed passage 47 at a rate controlled by the position of the needle valve 43. The fluid being bled off enters the axial portion 35 of the rear port 24 and from there exits the port 24.

The piston rod 18 continues to move rearwardly extensively and the skirt portion 111 of the seal 26 flexes inwardly within the recess 122 of the spacer 114. The skirt portion 111 engages the inside surface of the tube 137 in a sealing manner and continues to move rearwardly until the piston 20 engages the rear end block 16. Thus, by bleeding the trapped fluid via the passageway 47 at a controlled rate, the piston rod 18 and the piston 20 come to a stop at a very gradual controlled manner.

In order to then move the piston rod 18 extensively in a forward direction, its seal 26 out of engagement with the sleeve 31, fluid under pressure enters the port 24 and causes the skirt portion 111 of the seal 26 to flex uniformly inwardly into the annular recess 122 of the spacer 114. As a result, fluid is able to flow about the space between the skirt 111 and the inside surface of the sleeve 31. As a result, fluid under pressure then forces the piston 20 to move extensively in a forward direction. It should be noted that the seal 26 therefore serves as a check valve which enables the fluid to move from the port past the seal but not in a reverse direction. The piston 20 then moves in a forward direction in a conventional manner and then the seal 28 serves to provide a cushioned stop for the piston 20 when the skirt 132 of the seal 28 engages the sleeve 33 in a similar manner as the seal 26 cooperates with the sleeve 31 for cushioning the stop of the piston 20 in its forwardmost position.

With the construction of the piston cylinder assembly of the present invention, the compact design of the resulting cylinder enables it to be interchangeable with all other piston cylinder assemblies specified by the National Fluid Power Association, since the piston cylinder assembly of the present invention meets the standards of that association.

While there have been shown and described and pointed out the fundamental novel features of the invention, it will be understood that various omissions and substitutions and changes in the form and details of the arrangement illustrated and in its operation may be made by those skilled in the art, without departing from the spirit of the invention. It is the intention, therefore, to be limited only as indicated by the scope of the following claims.

What is claimed is:

1. A piston cylinder assembly adapted to be connected in fluid communication with a source of fluid under pressure:

cylinder means defining an elongated chamber;

a piston rod reciprocatively mounted within said piston chamber;

a piston fixed to said rod within said chamber;

means defining a pair of port means mounted at opposite ends of said cylinder means in fluid communication with said chamber and adapted to be connected in fluid communication with the source of fluid under pressure to enable said piston to be moved reciprocatively within said chamber, at least one of said port means having a laterally extending portion adapted to be connected in fluid communication with the source of fluid under pressure and having an axially extending portion intersecting transversely with said laterally extending portion and opening into the interior of said chamber, said laterally extending portion having a central axis extending transversely relative to the axis of said axial portion;

a tapered seal mounted on one of the end portions of said piston for sealing said axial portion of said one of said port means;

a sleeve member extending axially within the last-mentioned axial portion of said port means and being fixedly secured in place, said sleeve member having a tubular portion extending past the intersection between the laterally extending and axially extending portions and terminating at one of its ends at a position disposed opposite said lateral portion at least substantially the axis thereof; and bleeding means for permitting fluid to leave said chamber as said seal engages sealingly said sleeve member.

2. A piston cylinder assembly according to claim 1, wherein said one of its ends of said sleeve member is spaced about its periphery from said means defining a pair of port means within its port means.

3. A piston cylinder assembly according to claim 2, wherein said means defining a pair of port means includes a shoulder, said sleeve means including a peripheral flange seated against said shoulder.

4. A piston cylinder assembly according to claim 3, wherein said sleeve means is a tubular cylindrical member having said peripheral flange at one of its ends and having its opposite end spaced about its periphery from said means defining a pair of port means within its port means.

5. A piston cylinder assembly according to claim 1, wherein said seal is cup-shaped, said seal having an end wall and a depending skirt extending away from said sleeve.

6. A piston cylinder assembly according to claim 5, wherein said seal includes an aperture in its end wall, further including a flat head screw extending through said aperture and fastened into the distal end of said piston rod.

7. A piston cylinder assembly according to claim 1, further including a second tapered seal mounted on the opposite end portion of said piston head for sealing the axial portion the other one of said pair of port means, a second sleeve member extending axially within the last-mentioned axial portion of said other one of said pair of port means and terminating at one of its ends at a position disposed opposite the lateral portion of the last-mentioned port means.

8. A piston cylinder assembly according to claim 1, wherein said means defining a pair of port means includes a pair of end blocks having said port means mounted therein, tie rods connecting rigidly said end blocks together, at least one of said end blocks having openings therein, at least one of the ends of said tie rods being threaded and extending into said openings, connecting means disposed within said openings for securing threadably the threaded end portions of said rods to their end block, further including a perforated mounting device attached to the outer face of the last-mentioned end block, a plurality of connecting devices for fastening releasably to said connecting means to attach releasably said mounting device to the last-mentioned end block.

* * * * *